W. O. LUM.
MOTOR CONTROL SYSTEM.
APPLICATION FILED MAR. 30, 1914.
1,175,367.
Patented Mar. 14, 1916.
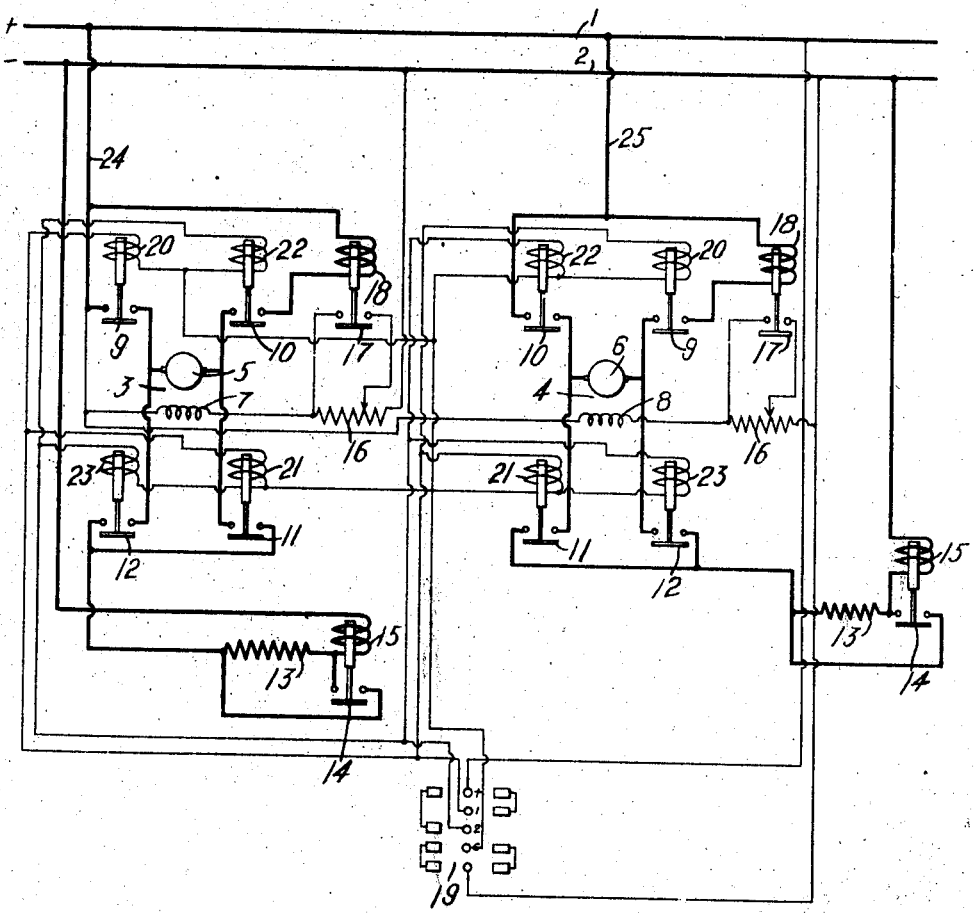
WITNESSES:
INVENTOR
Walter O. Lum
BY
ATTORNEY

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,175,367.

Specification of Letters Patent. Patented Mar. 14, 1916.

Application filed March 30, 1914. Serial No. 828,206.

*To all whom it may concern:*

Be it known that I, WALTER O. LUM, a citizen of the United States, and a resident of Wilkinsburg, in the county of Allegheny and State of Pennsylvania, have invented a new and useful Improvement in Motor-Control Systems, of which the following is a specification.

My invention relates to motor control systems, and it has particular reference to systems that are adapted to be employed in connection with pipe-rolling machines and similar mechanisms.

My invention has for its object to provide a system of the above indicated character in which a plurality of electric motors, that are connected in parallel relation, may be alternately controlled to prevent their operation as generators.

In the operation of pipe-rolling, or pipe-straightening machines, and similar mechanisms, the rolls are usually placed at an angle with each other and are provided with separate driving motors. A table comprising a series of rollers provides a support for the pipe during the process of rolling or straightening. In case the torque of one of the motors exceeds that of the other, the material being rolled will be shifted vertically out of engagement with the rolls; but if the torque of the other motor is the greater, the material will be held in position against the table. When the direction of rotation is reversed, the opposite conditions obtain and the torque of the first mentioned motor should be the greater. It is necessary, therefore, to prevent the torque of one of the motors from exceeding that of the other when the rolls are operated in one direction, and to similarly control the other motor when the direction of rotation of the rolls is reversed.

I provide a system of control in which one of the driving motors is automatically controlled by means of appropriate mechanism to assume only a small proportion of the load and also, to prevent it from being driven by the other motor as a generator. The motors are thus controlled alternately, according to the direction of rotation of the rolls of the machine.

In the accompanying drawing, the single figure is a diagrammatic view of circuits and apparatus embodying my invention.

Current is supplied from line conductors 1 and 2, which may be connected to any suitable source of current, to motors 3 and 4 that are connected in parallel relation. The motors 3 and 4 respectively comprise armatures indicated at 5 and 6 and shunt field windings 7 and 8. The direction of rotation of the motor 3 is controlled by electromagnetically operated switches 9, 10, 11 and 12, the switches 9 and 11 being closed when the motor is to operate in one direction, and the switches 10 and 12 being closed for rotation in the reverse direction. A resistor 13, which is connected in series relation with the armature 5 of the motor 3, is adapted to be short-circuited by a switch 14 when its actuating coil 15 is traversed by a current which exceeds a predetermined value. A resistor 16, which is connected in series relation with the field windings 7, is controlled by a switch 17 that is arranged to open when the current traversing its actuating coil 18 falls below a predetermined value.

The circuits of the motor 4 are substantially identical with those of the motor 3 and similar numerals are employed to designate corresponding parts. The direction of rotation of the motors 3 and 4 is controlled by a controller 19 which, when in one position, causes the actuating coils 20 and 21 of the switches 9 and 11 respectively to be energized, and when in a second position, to cause the coils 22 and 23 of the switches 10 and 12 respectively to be energized.

It may be assumed that the various parts occupy their respective positions as illustrated. If the controller 19 be actuated to the right, as shown, the switches 9 and 11 will be closed to complete the armature circuits of the motors 3 and 4. The circuit of the motor 3 extends from the line conductor 1 through a conductor 24, switch 9, armature 5, switch 11, armature resistor 13, and coil 15 to the line conductor 2. The circuit of the motor 4 extends from the line conductor 1 through a conductor 25, coil 18, switch 9, armature 6, switch 11, armature resistor 13 and coil 15 to the line conductor 2. The switches 14 will be closed by the respective coils 15 to short circuit the corresponding armature resistors 13. The coil 18 is energized by the current traversing the armature 6 of the motor 4 and, if this current exceeds a predetermined value, the switch 17 is closed to short circuit the resistor 16 that is in series with the shunt field winding 8. The result is to cause the field of the motor 4 to be strengthened and thus decrease the armature current. Consequently, the motor 4 develops a torque much less that of the motor 3. Under the most desirable operating conditions, the motor 4 receives only sufficient current to prevent it being driven as a generator by the motor 3, substantially the entire load being assumed by the motor 3. If the current traversing the coil 18 falls below a predetermined minimum value, the switch 17 opens the short-circuit of the resistor 16 to insert it in series with the field winding 8 and thus increase the value of the current received by the armature 6, as will be readily understood. The motor 4 is thus prevented from operating as a generator by being caused to develop sufficient torque to follow the motor 3. The switch 17 operates also to prevent the torque of the motor 4 from equaling that of the motor 3.

When the controller is moved to its other position, the several switches 9 and 11 are allowed to open and the switches 10 and 12 are closed. The coil 18, which controls the switch 17 that is in circuit with the motor 4, is rendered inoperative by the opening of the switches 9 and 11. The coil 18 that is in circuit with the motor 3, is now energized by the closing of the switches 10 and 12. The operations of the respective motors is the same as before, except that conditions are reversed. The coil 18 that is in circuit with the armature 5 of the motor 3, operates in the same manner as described in connection with the motor 4 to automatically control the torque of the motor 3.

It will be noted that I have provided a simple and effective means for automatically controlling the torque of a motor when it is operated in one direction and for preventing the motor from being driven as a generator. I have also provided a system in which two motors thus controlled are arranged to alternately assume a mechanical load according to the direction of rotation.

I claim as my invention:

1. In a motor control system, the combination with a source of current, and an electric motor, of means dependent upon the value of the current supplied to said motor for automatically controlling the torque of said motor when it rotates in one direction, and means for rendering said controlling means inoperative when said motor rotates in the opposite direction.

2. In a motor control system, the combination with a source of current, and a plurality of electric motors, of means dependent upon the value of the current supplied to the respective motors for automatically controlling the torque of each of said motors, and means for controlling the direction of said motors and for controlling said automatic controlling means.

3. In a motor control system, the combination with a source of current, and a plurality of electric motors connected in parallel relation, of means for automatically accelerating each of said motors when its armature current falls below a predetermined value, said means being operative only when the several motors rotate in one direction.

4. In a motor control system, the combination with a pair of electric motors connected in parallel relation, of means for automatically increasing the torque of one of said motors when its armature current falls below a predetermined value, when said motor is rotating in one direction, and means for rendering said automatic means inoperative when the motor rotates in the reverse direction.

5. In a motor control system, the combination with a source of current, and a plurality of motors connected thereto, of means comprising a controller for controlling the direction of rotation of said motors, and means controlled by said controller for automatically controlling the torque of each of said motors in accordance with the value of the current supplied thereto when the respective motors rotate in one direction only.

6. In a motor control system, the combination with a source of current and a plurality of motors connected thereto, of means for automatically controlling the torque of each of said motors when it rotates in a certain direction, said controlling means comprising coils in series relation with the respective motor armatures, and means for simultaneously controlling the direction of rotation of said motors and the circuit connections of said coils.

7. In a motor control system, the combination with a source of current, and an electric motor connected thereto, of means for automatically controlling the torque of said motor when its armature current falls below a predetermined value, said means comprising a coil in circuit with the motor armature, means comprising a controller for controlling the direction of rotation of said motor and for opening and closing the circuit of said coil according to the position of said controller.

8. In a motor control system, the combination with a source of current, and a plurality of electric motors connected thereto, of means for automatically increasing the torque of each of said motors under predetermined circuit conditions, and means comprising a controller for controlling the direction of rotation of said motors, said controller operating, when in one position, to render inoperative the automatic means for controlling one of said motors, and when in a second position, to render inoperative a second automatic controlling means.

In testimony whereof, I have hereunto subscribed my name this 21st day of Mar., 1914.

WALTER O. LUM.

Witnesses:
R. T. KINTZING,
B. B. HINES.